No. 853,173. PATENTED MAY 7, 1907.
K. JACOBI.
CULINARY VESSEL.
APPLICATION FILED SEPT. 9, 1905.
Fig: 1.
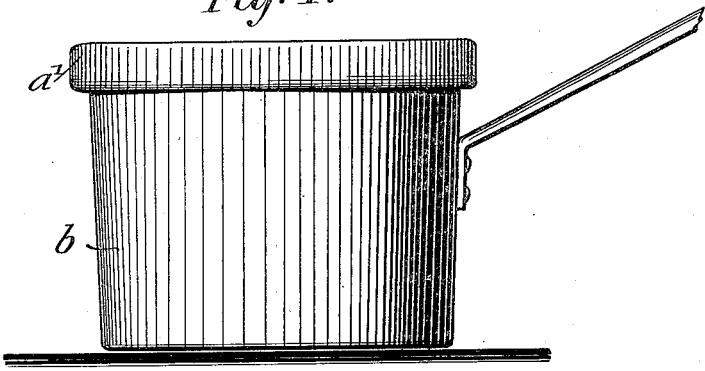
Fig: 2.
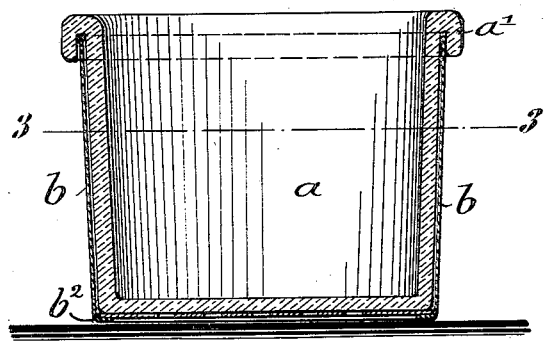
Fig: 3.
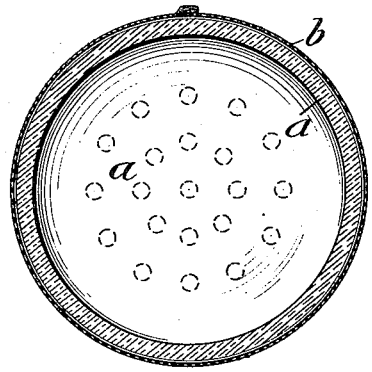
Witnesses
Inventor
Karl Jacobi
By his Attorneys

UNITED STATES PATENT OFFICE.

KARL JACOBI, OF NEW ROCHELLE, NEW YORK, ASSIGNOR OF ONE-HALF TO CHARLES JORDAN, OF NEW ROCHELLE, NEW YORK.

CULINARY VESSEL.

No. 853,173.  Specification of Letters Patent.  Patented May 7, 1907.

Application filed September 9, 1905. Serial No. 277,648.

*To all whom it may concern:*

Be it known that I, KARL JACOBI, a citizen of the United States, residing in New Rochelle, in the county of Westchester and State of New York, have invented certain new and useful Improvements in Culinary Vessels, of which the following is a specification.

This invention relates to a culinary vessel of that class in which the body is made of porcelain, glass, earthenware or other vitrified material and inclosed by a projecting jacket of suitable sheet-metal, so that the outer portion is protected against breakage and a vessel of sanitary properties and great durability is obtained; and for this purpose the invention consists of a culinary vessel which comprises the novel features which will be fully described hereinafter and finally pointed out in the claims.

In the accompanying drawings, Figure 1 represents a side-elevation of my improved culinary vessel, Fig. 2 is a vertical central section of the same, and Fig. 3 is a horizontal section on line 3—3, Fig. 2.

Similar letters of reference indicate corresponding parts in the different figures of the drawings.

Referring to the drawings, $a$ represents the body-portion of my improved culinary vessel. This body is preferably made of porcelain, glass, earthenware or other vitrified material preferably of slightly conical shape and provided at its upper end with an outwardly and downwardly turned flange $a^1$. The body $a$ is surrounded by a protecting jacket $b$ of copper, tin or other suitable material which fits closely around the body $a$ substantially throughout the area of its side-wall and into the space formed between the circumferential flange $a^1$, as shown in Fig. 2. The protecting sheet-metal jacket or cover $b$ is provided with a bottom having holes so as to give access to the heat from the cooking-stove to the bottom of the body-portion $a$ of the vessel. The perforated bottom rests on an inwardly-bent flange $b^2$ of the jacket or cover $b$ and fits snugly against the bottom of the body or receptacle $a$. The sheet-metal jacket protects the vitrified body $a$ against breakage while handling the same and imparts great durability to the vessel. In case the vitrified body should break by accident, it can be readily replaced and the cover used in connection with a new vitrified body.

The advantages of my improved culinary vessel are, first, that it is specially adapted for cooking vegetables, fruits, etc., which should not be cooked in copper or other metallic vessels, the vitrified body forming a sanitary vessel for such vegetables and fruits; secondly, by the protection formed by the inclosing jacket or cover the vitrified body is rendered more durable and capable of being used for a considerable length of time without breakage, so that thereby a new style of culinary vessel is supplied for domestic, restaurant or other purposes.

Having thus described my invention, I claim as new and desire to secure by Letters Patent:

A culinary vessel consisting of a vitrified receptacle provided at its upper edge with an outwardly and downwardly turned circumferential flange, an exterior jacket fitting snugly about said receptacle substantially throughout the area of its side-wall and extending at its upper edge into the space between said flange and said receptacle, said jacket being provided at its bottom edge with an inwardly-turned flange, and a separate bottom resting on said flange and fitting closely against the bottom of said receptacle.

In testimony, that I claim the foregoing as my invention, I have signed my name in presence of two subscribing witnesses.

KARL JACOBI.

Witnesses:
 PAUL GOEPEL,
 HENRY J. SUHRBIER.